No. 740,064. PATENTED SEPT. 29, 1903.
F. THOMSON.
APPARATUS FOR HEATING TIRES.
APPLICATION FILED MAR. 20, 1903.
NO MODEL.
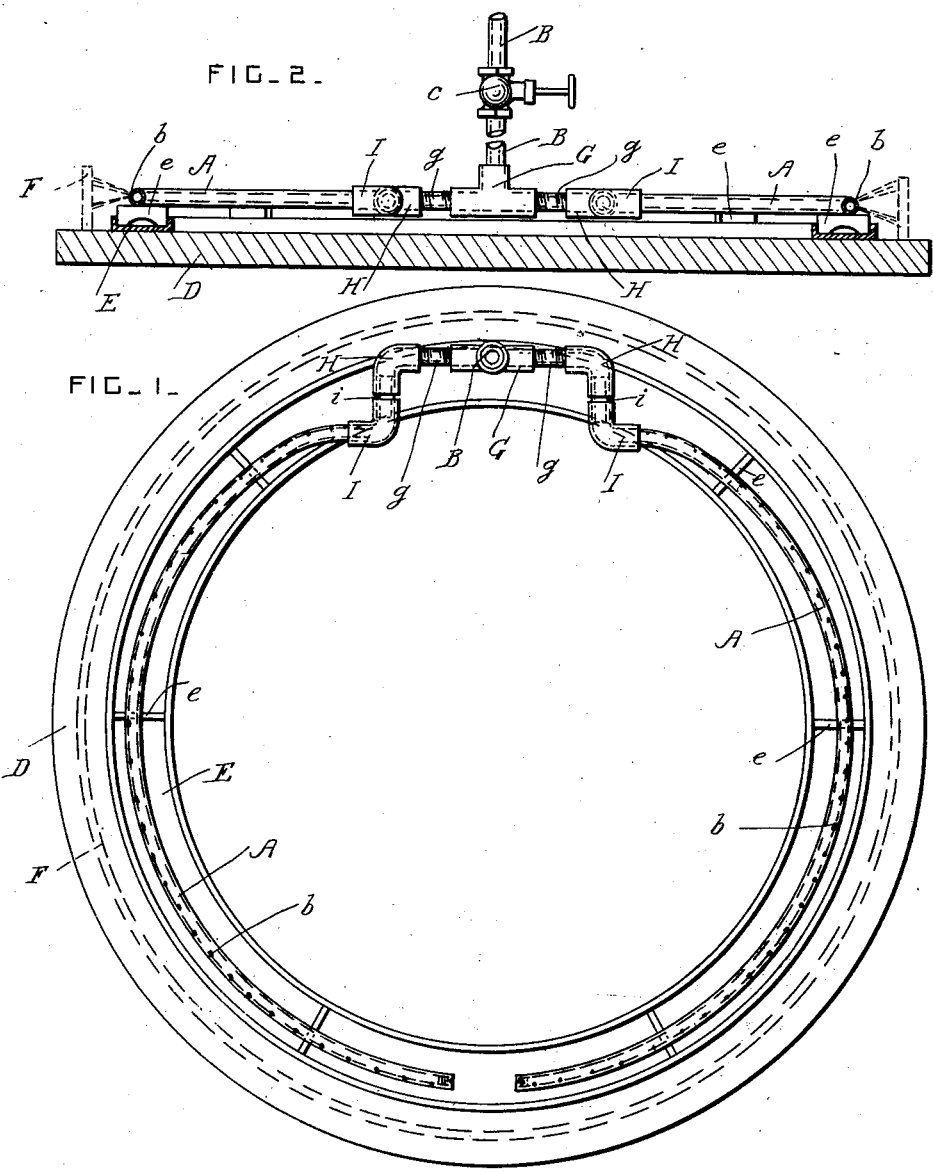
WITNESSES
John C. O'Shea
Walter Donaldson
INVENTOR
Frank Thomson
by Herbert W. J. Jenner.
Attorney No. 740,064. Patented September 29, 1903.

UNITED STATES PATENT OFFICE.

FRANK THOMSON, OF SANTA ANA, CALIFORNIA.

APPARATUS FOR HEATING TIRES.

SPECIFICATION forming part of Letters Patent No. 740,064, dated September 29, 1903.

Application filed March 20, 1903. Serial No. 148,763. (No model.)

*To all whom it may concern:*

Be it known that I, FRANK THOMSON, a citizen of the United States, residing at Santa Ana, in the county of Orange and State of California, have invented certain new and useful Improvements in Apparatus for Heating Tires; and I do hereby declare the following to be a full, clear, and exact description of the invention, such as will enable others skilled in the art to which it appertains to make and use the same.

This invention relates to apparatus for heating the tires of vehicles; and it consists in the novel construction and combination of the parts hereinafter fully described and claimed.

In the drawings, Figure 1 is a plan view of the apparatus. Fig. 2 is a cross-section through the apparatus.

A A are two semicircular pipes provided with a series of small holes or perforations b for the passage of oil and gas. These two pipes are secured to a T-socket pipe, and they may be opened and closed to suit tires of different sizes.

B is the oil-supply pipe, which is connected to the T-socket pipe G and which is provided with a regulating-valve c of any approved construction. The pipe B is connected to an oil-reservoir, which is supplied with any kind of cheap petroleum-oil.

D is a support for the tire and the apparatus. This support may be built of bricks, and it preferably has a flat upper surface.

E is a shallow annular trough arranged under the pipes A A, and e represents brackets which project upward from the trough. The pipes A A rest upon these brackets.

F is the tire, which is indicated by dotted lines.

A little oil is first allowed to flow into the trough and is ignited. When the pipes A A become hot, the oil-valve is again opened. The oil is converted into gas in the pipes A A, and the gas is ignited as it issues from the holes or perforations b, and the tire is heated by these gas-jets.

In order that the two semicircular or curved pipes A may be adjusted to tires of different diameter, they are not connected directly to the T-socket G, which is screwed onto the oil-supply pipe B. The T-socket G has nipples g g, which are screwed into its respective ends, so as to be adjustable. H represents elbow-pipes which are screwed onto the outer ends of the nipples g g, and I represents elbow-pipes which are connected to the outer ends of the elbow-pipes H by means of screw-threaded nipples i. The pipes A A are screwed into the outer ends of the pipes or sockets I, and they are opened and closed by means of the nipples g g, which are revolved so as to adjust the position of the parts connected to them with reference to the T-socket. Double elbow sockets or pipes can be used, if desired, in place of the two sockets H and I, connected by means of nipples.

What I claim is—

1. In apparatus for heating tires, the combination, with an oil-supply pipe, and a T-socket secured to it; of two double-bend sockets adjustably connected with the said T-socket, and curved perforated pipes carried by the said double-bend sockets.

2. In apparatus for heating tires, the combination, with an oil-supply pipe, and a T-socket secured to it, of adjustable screw-threaded nipples engaging with the ends of the said T-socket, elbow-sockets forming double bends and carried by the said nipples, and curved perforated pipes carried by the said elbow-sockets.

In testimony whereof I affix my signature in presence of two witnesses.

FRANK THOMSON.

Witnesses:
JOHN N. ANDERSON,
H. R. SMITH.